July 21, 1925. 1,546,543
W. J. KAAR
VEHICLE DIRECTION INDICATOR
Filed Nov. 25, 1924 2 Sheets-Sheet 1
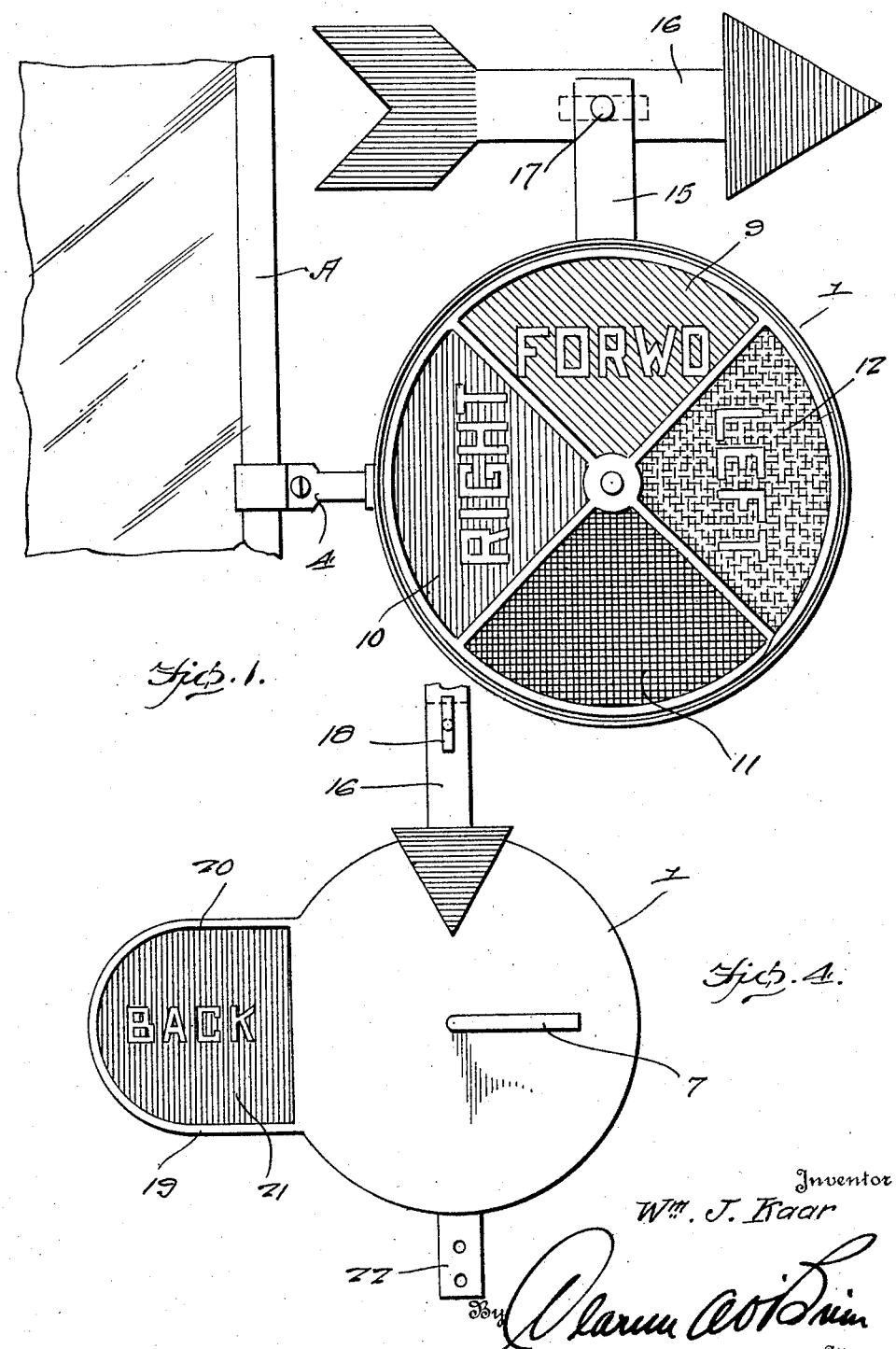

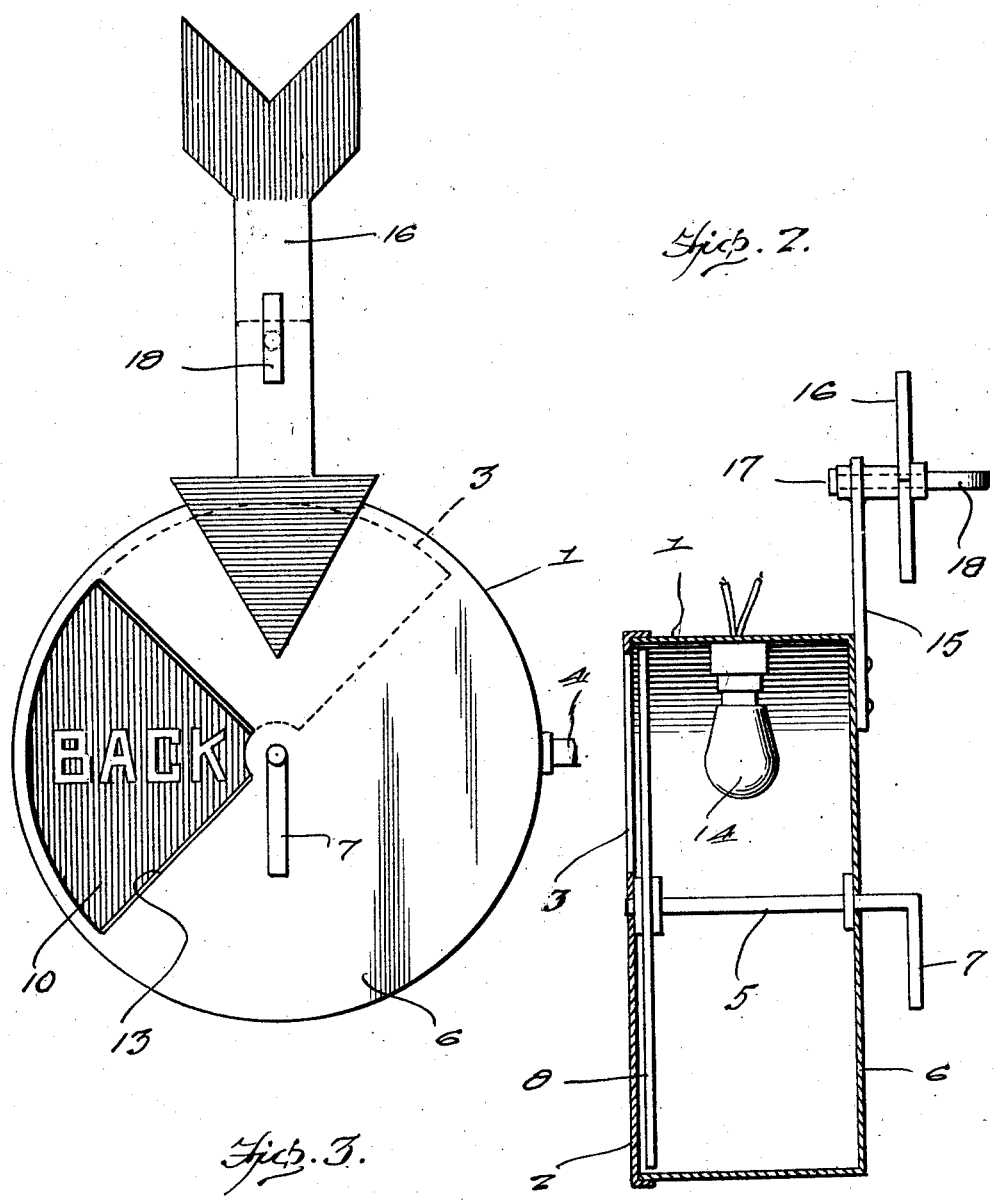

Patented July 21, 1925.

1,546,543

UNITED STATES PATENT OFFICE.

WILLIAM J. KAAR, OF SHERMAN, TEXAS.

VEHICLE DIRECTION INDICATOR.

Application filed November 25, 1924. Serial No. 752,189.

*To all whom it may concern:*

Be it known that I, WILLIAM J. KAAR, a citizen of the United States, residing at Sherman, in the county of Grayson and State of Texas, have invented certain new and useful Improvements in Vehicle Direction Indicators, of which the following is a specification.

This invention relates to improvements in vehicle direction indicators, and has for its principal object to provide a simple and efficient means whereby approaching vehicles may readily ascertain the direction or course to be followed by the vehicle, upon which the signal is mounted.

Another important object of the invention is to provide a vehicle direction indicator of the above mentioned character, wherein the same is supported on the vehicle to permit the operator thereof to have ready access thereto, so that the proper signal may be actuated.

A further object is to provide a vehicle direction indicator of the above mentioned character, which includes a means for permitting the signal to be readily visible either during the day time, or at night.

A further object is to provide a vehicle direction indicator of the above mentioned character, which is simple in construction, inexpensive, strong and durable, and further well adapted for the purposes for which it is designated.

Other objects and advantages of this invention will become apparent during the course of the following description.

In the accompanying drawings, forming a part of this specification, and in which like numerals designate like parts throughout the same:

Figure 1 is a front elevation of the vehicle direction indicator embodying my invention, showing the same mounted on the wind shield frame of an automobile with the front face of the casing removed.

Figure 2 is a vertical sectional view, through the casing.

Figure 3 is a rear elevation, and

Figure 4 is a rear elevation of a modification.

In the drawings, wherein for the purpose of illustration is shown the preferred embodiment of my invention, the numeral 1 designates the casing, the same being substantially cylindrical. The cylindrical casing 1 has its front face open and normally closed or covered by a cover plate 2. The cover plate is provided with a segmental opening 3, and the purpose thereof will be hereinafter more fully described. The casing 1 is supported adjacent the windshield frame A of an automobile, by means of the bracket 4. A shaft 5 extends centrally through the casing and is journalled in suitable bearings provided in the cover 2 and the rear face 6 of the casing. The rear end of the shaft 5 extends outwardly of the rear face 6 of the casing 1 and terminates in the handle portion 7. A signalling disc 8 of any suitable transparent material is mounted on the shaft 5 and is disposed within the casing 1, adjacent the front face or cover 2 of the casing.

The signalling disc 8 is divided into quadrant portions 9, 10, 11 and 12 respectively. The quadrant 9 is preferably colored green and has printed thereon the word "Forward." The quadrant 10 is colored red and has printed thereon the word "Right." The quadrant 11 is colored black and has no indicia printed thereon. The quadrant 12 is colored yellow and has printed thereon the word "Left." On the rear face of the signalling disc 8, preferably on back of the quadrant 10, is printed the word "Back" and the same will be visible from the rear when the quadrant 10 is disposed in registry with the segmental opening 13 formed in the rear face 6 of the casing 1, as clearly illustrated in Figure 3. An electric lamp 14 is disposed within the casing 1, for illuminating the same, and rendering the various quadrants of the signalling discs visible, when in registry with the openings 3 and 13 respectively. It is, of course, to be understood that the lamp 14 is only used, at night, so that the signal is readily visible at a distance, by approaching vehicles.

When the operator of the vehicle upon which the signal is mounted is desirous of making a right hand turn, the handle 7 is rotated in a predetermined direction, so that when the handle assumes a certain position, the quadrant 10 will be in registry with the segmental opening 3 provided in the cover 2 and the word "Right" will be visible. In a similar manner, by rotating the handle 7 to maintain various other predetermined positions, the other quadrants may be brought into registry with the opening 3, independently of each other, so that the proper signal may be given to approaching vehicles, whereby the direction or course to be followed by the vehicle upon which the signal is mounted may be readily ascertained. When the vehicle is about to back up, the operator turns the handle 7, until the segment having the word "Back" printed thereon is in registry with the segmental opening 13 provided in the rear face of the cover of the casing 1, that the vehicles in the rear may readily see the signal.

Secured to the rear face of the casing 1 and extending upwardly therefrom is the standard 15. An arrow 16 is pivotally supported on the upper end of the standard, as illustrated at 17, and associated with the rear face of the intermediate portion of the arrow for facilitating the actuation thereof is the knob 18. The arrow 16 is adapted to be used during the day time, and may be readily moved to various positions to indicate a course or direction to be pursued, by turning the knob 18. When the vehicle upon which the signal is mounted is travelling straight ahead, the point of the arrow is disposed downwardly as illustrated in Figure 3. When a left hand turn is made, the arrow 16 is turned so that the point thereof will be in the left hand direction, and manifestly, when a right hand turn is to be made, the arrow will point in the right hand direction.

In Figure 4 of the drawings, a modification is shown, wherein the casing is provided with an extension 19, the rear face of which is open, as illustrated at 20, and disposed therein is a transparent signalling disc 21, on which is printed the word "Back." The purpose of this construction is to provide a device which is principally adapted to be used in connection with vehicles of the closed type, so that pursuing vehicles may readily see the signal 21 and the usual signalling means which is to be viewed from the front of the casing may be seen from the windshield. A bracket, such as is shown at 22, is associated with the casing illustrated at Figure 4, for attaching the vehicle direction indicator in position when used, in connection with a closed car.

It will thus be seen from the foregoing description that a vehicle direction indicator has been provided, which is at all times accessible to the operator, and the simplicity thereof enables the same to be easily and efficiently actuated for indicating the course or direction to be followed by the vehicle.

While I have shown the preferred embodiment of my invention, it is to be understood that various changes in the size, shape, and arrangement of parts, may be resorted to, without departing from the spirit of the invention or the scope of the appended claim.

Having thus described my invention, what I claim is:

A vehicle direction indicator comprising a cylindrical casing, an attaching bracket associated therewith, the front face of the casing having a segmental opening therein, a shaft journaled centrally in said casing, a transparent signalling disc mounted on said shaft adjacent the front face of the casing, said disc being divided into quadrant portions, each of said quadrants having indicia printed thereon, the rear face of the casing having a segmental opening therein disposed out of alignment with the opening in the front face, one of said quadrants having indicia printed on the back face thereof whereby the indicia is visible from the rear of the casing, when said quadrant is disposed in communication with the segmental opening in the rear face of the casing, means for rotating the shaft and said signalling disc, and a lamp in the casing for illuminating the signal.

In testimony whereof I affix my signature.

WILLIAM J. KAAR.